United States Patent Office 3,316,093
Patented Apr. 25, 1967

3,316,093
COLORED PHOTOIMAGES FROM FERRIC SALTS OF PHENOLIC α-HYDROXY ACIDS
Edward Cerwonka, Binghamton, N.Y., assignor to General Aniline & Film Corporation, New York, N.Y., a corporation of Delaware
No Drawing. Filed Jan. 2, 1964, Ser. No. 335,399
18 Claims. (Cl. 96—92)

The present invention relates to light-sensitive materials capable of yielding colored photoimages of ferric salts of phenolic α-hydroxy acids and to a method of producing such images.

As is known when a ferric salt is exposed to actinic light, the iron is reduced from the ferric to the ferrous state. If the ferric salt be that of an α-hydroxy acid, the reduction of the iron is accompanied by oxidation of the hydroxy acid to an aldehyde or a ketone with concomitant loss of carbon dioxide. For example, mandelic acid yields benzaldehyde as a by-product, whereas citric acid produces acetone as a by-product.

If the ferrous salt resulting from such reaction is brought into contact with aqueous hydrogen peroxide, hydroxyl radicals will be liberated according to the equation:

(1) $\quad Fe^{+2} + H_2O_2 \rightarrow Fe^{+3} + \cdot OH + OH^-$

Hydoxyl radicals produced in this manner have been utilized in the past to initiate polymerization of ethylenically unsaturated monomers containing a

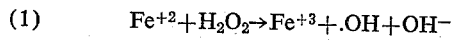

group such as a vinyl or vinylidene monomer. Hence, when a light-sensitive ferric salt and such a monomer are incorporated in a coated layer and the coating irradiated, the result is a latent image which can be developed with a per compound to a relief image, as has been previously recognized.

Another known application of the iron-peroxide reaction, sometimes designated Fenton's reaction, involves the action of hydroxyl radicals on phenol to yield pyrocatechol, among other substances, according to the formula:

(2) 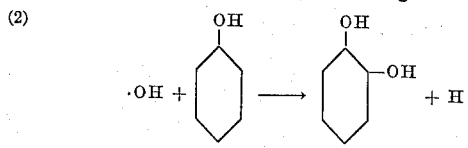

It is known that the interaction of ferric ions and catechol will result in the formation of a green-black complex dye ion. Such ions are found to have the general structure:

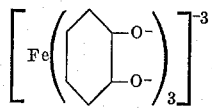

The present invention involves the adroit manipulation of the principles of these reactions to produce colored images in a light-sensitive element. Typically the ferric salt of a phenolic α-hydroxy acid is mixed with a hydrophilic colloidal binder and coated on a suitable base. It is preferred, though not absolutely necessary, that an ethylenically unsaturated monomer containing a

group also be included in the coating composition. This results in strong photographic resist images. However, a colored photoimage can be formed even in the complete absence of the monomer.

A variety of phenolic α-hydroxy acids and combinations thereof also may be employed for the purposes of this invention. m-Hydroxy mandelic acid is a good example of a suitable acid. On exposure to actinic light in the presence of ferric ions this decomposes to produce m-hydroxybenzaldehyde according to the equation:

(3) 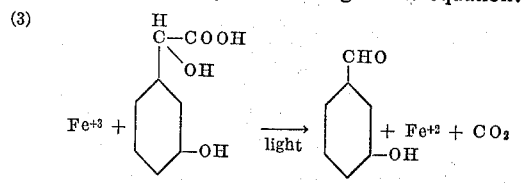

During the exposure step no coloration of the coating takes place. However, subsequent immersion of the coated layer in a solution of a per compound, preferably aqueous hydrogen peroxide, will produce hydroxy radicals according to equation (1) above. These hydroxyl radicals then enter the ring of the m-hydroxybenzaldehyde as follows:

(4) 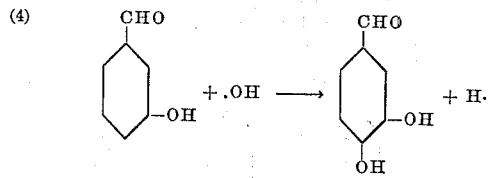

Inasmuch as a ferric ion has simultaneously been formed with a hydroxyl radical according to the Equation 1 the association of the ferric ion and the 3,4-dihydroxybenzaldehyde yields a greenish-black dye compound. This is typical of the ferric-catechol type of complex produced according to the present invention.

After the greenish-black image is produced, the coated layer is next subjected to a warm water wash which removes the uncolored areas. As a result, there remains adhering to the paper base or other support a greenish-black deposit of coating material in the exposed areas only.

As previously stated, best results ensue when an ethylenically unsaturated monomer is employed. Preferably, such a monomer contains a

group activated by direct attachment to a negative group such as halogen,

$C \equiv N$, $C \equiv C$, —OR or aryl. Examples of such monomers are acrylamide, acrylonitrile, N-ethanolacrylamide, methacrylic acid, acrylic acid, calcium acrylate, methacrylamide, methylacrylate, vinylmethyl ether, vinylbutyl ether, N,N'-methylene-bis-acrylamide, or the like. The monomer when polymerized leads to a resist which serves to bind the colored image to a considerable degree. Hence there is less stain in the unexposed areas after washout.

In lieu of the m-hydroxymandelic acid mentioned above, a number of other phenolic α-hydroxy acids may be used, for example:

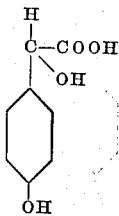
p-Hydroxymandelic acid

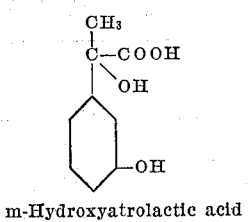
m-Hydroxyatrolactic acid

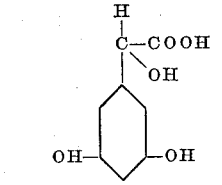
3,5-dihydroxymandelic acid

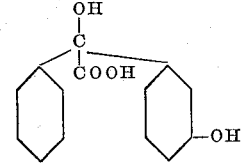
3-hydroxybenzilic acid

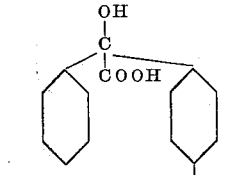
4-hydroxybenzilic acid

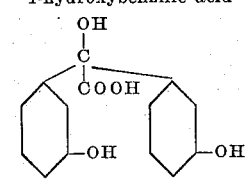
3,3'-dihydroxybenzilic acid

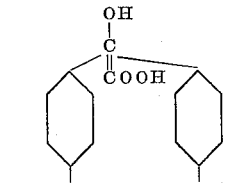
4,4'-dihydroxybenzilic acid

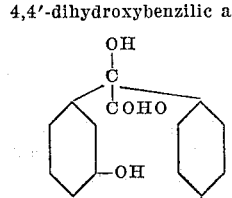
3,4'-dihydroxybenzilic acid

However, those α-hydroxy acids which are derivatives of pyrocatechol, such as 3,4-dihydroxymandelic acid,

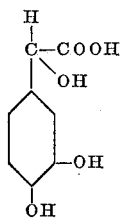

or derivatives of pyrogallol, such as 3,4,5-trihydroxymandelic acid

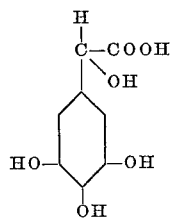

apparently do not react in the same manner. These acids have not been found at all suitable for the formulations of this invention. This apparently is because of their property of chemically reducing the ferric ion to ferrous ion in the absence of light. To produce a photographic image it is necessary, of course, that the reduction of the ferric ion takes place only in areas exposed to light. Neither is o-hydroxymandelic acid

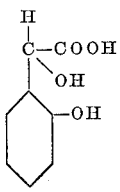

suitable for the purposes of this invention. The reason in this case is a different one. This acid forms an insoluble lactone in the coating formulations and hence becomes inoperative.

The binder employed is a hydrophilic colloidal material such as hydroxymethyl cellulose, polyvinyl pyrrolidone, polyvinyl piperidone, polyvinyl caprolactam, polyacrylamide, polymethacrylamide, or the like. The binder, of course, plays the very important role of maintaining the constituents of the light-sensitive layers in juxtaposition on the base.

The ferric salt employed may be the preformed salt of the α-hydroxy carboxylic acid or it may be formed in situ in the coating solution. In the latter case, the ferric salt used may be ferric acetate, ferric chloride, ferric nitrate, ferric sulfate, ferric phosphate, ferric ammonium acetate, ferric ammonium nitrate, or the like.

The per compound, the use of which is contemplated herein, must be hydrogen peroxide to obtain the ferric-catechol complex ion. Many per compounds release radicals other than hydroxyl radicals when brought into contact with ferrous ion. For example, methyl hydroperoxide reacts with ferrous ion as follows:

$$Fe^{+2}+CH_3OOH \rightarrow CH_3O \cdot + Fe^{+3}+OH^-$$

Organic radicals such as methoxyl ($CH_3O \cdot$) initiate the polymerization of vinyl monomers, but cannot possibly yield a catechol type of compound which is necessary for the green-black color to be achieved in the presence of ferric ion. Likewise, ammonium persulfate gives rise to a persulfate radical which is also not suitable for this process.

The base to which the sensitized composition may be applied may be any conventional material such as paper, film, metal, or the like.

The proportion of the components in the light-sensitive element may vary, but generally there is used per part by weight of monomer 1.5 to 4 parts by weight of binder and 2 to 3 parts by weight of ferric salt and α-hydroxy carboxylic acid. Optimum colored images are achieved when the mol ratio of α-hydroxy carboxylic acid to ferric salt lies between 3:1 and 1:1.

The invention will be more fully understood by reference to specific examples.

EXAMPLE I

A composition was prepared of the following ingredients:

| | |
|---|---|
| Hydroxyethyl cellulose | g__ 2.50 |
| N,N'-methylene-bis-acrylamide | g__ 1.00 |
| Ferric ammonium sulfate dodecahydrate | g__ 2.88 |
| m-Hydroxymandelic acid | g__ 3.00 |
| (neutralized with 3 ml. ammonium hydroxide, 6 N) | |
| Water, to make | ml__ 50 |

The solution was filtered in red light and then was coated on baryta paper, also in red light, and allowed to dry. A sample of the coated sheet was then exposed for five seconds to the light from a 375 watt reflector lamp at 16 inches distance. The exposed sheet was then immersed for 10 to 15 seconds in a 1 percent aqueous solution of hydrogen peroxide. A colored image was formed during the immersion. The sheet was subsequently washed with warm water at a temperature between 40° and 60° C. to remove the unpolymerized areas. The result was a green-black colored resist image in the exposed areas.

EXAMPLE II

The same formulation was used in Example I. However, this composition was coated on cellulose acetate butyrate base and allowed to dry before exposure. In other respects, exposure and processing were carried out as in Example I. The result was a permanently colored green-black image on the filmbase.

EXAMPLE III

The same formulation as given in Example I above was again prepared, except that p-hydroxymandelic acid (3.00 grams) was substituted for the m-hydroxymandelic acid. The coating composition was applied to baryta paper, as before, then exposed and developed in the same manner as in Example I, with similar results.

EXAMPLE IV

The same formulation again was used as in Example I, except that m-hydroxatrolactic acid (3.30 grams) was substituted for the m-hydroxymandelic acid. The coating was applied to baryta paper as in Examples I and III and the sheet was dried. The coated sheet was then exposed in the same manner as in Example I and developed by treatment with a 1 percent solution of hydrogen peroxide followed by washing in warm water. The results were essentially the same as in Example I.

EXAMPLE V

In this case the same formulation was used as in Example I, except that 15 grams of polyvinyl pyrrolidone were substituted for the hydroxyethyl cellulose as a binder for the coating material. It will be noted that the polyvinyl pyrrolidone was employed in substantially greater quantities than the cellulose. This material was processed, coated on paper, exposed and developed in the same manner as in Example I with essentially similar results.

It will be obvious to those skilled in the art that various modifications may be made in the formulation and in other steps of the process without departing from the spirit of this invention. It is intended by the claims which follow to claim both the process and the product sufficiently broadly to cover the obvious variations and to cover the invention as broadly as is consistent with the prior art.

What is claimed is:

1. A method of forming colored photographic images which comprises coating a support sheet with a light-sensitive coating composition which comprises an aqueous solution of a ferric salt, a phenolic α-hydroxy acid, and a hydrophilic colloidal binder, exposing the coated support to actinic radiation, developing an image in exposed areas by application of aqueous hydrogen peroxide, and washing out the undeveloped areas to leave a color image in exposed areas.

2. Method according to claim 1 wherein the hydroxy acid is p-hydroxymandelic acid.

3. Method according to claim 1 wherein the acid is m-hydroxymandelic acid.

4. Method according to claim 1 wherein the acid is m-hydroxyatrolactic acid.

5. Method according to claim 1 wherein the acid is 3,5-dihydroxymandelic acid.

6. Method according to claim 1 wherein the ferric salt is ferric ammonium sulfate.

7. As an article of manufacture, a coated support sheet bearing a photographically-sensitive coating comprising a ferric salt, a phenolic α-hydroxy acid, and a binder.

8. Product according to claim 7 wherein the binder is hydroxyethyl cellulose.

9. Product according to claim 7 wherein the binder is polyvinyl pyrrolidone.

10. Product according to claim 7 wherein the acid is m-hydroxymandelic acid.

11. Product according to claim 7 wherein the acid is p-hydroxymandelic acid.

12. Product according to claim 7 wherein the acid is m-hydroxyatrolactic acid.

13. Product according to claim 7 wherein the acid is 3,5-dihydroxymandelic acid.

14. Product according to claim 7 wherein the ferric salt is ferric ammonium sulfate.

15. Product according to claim 7 wherein the coating comprises also an ethylenically unsaturated monomer containing a

group capable of yielding a polymeric relief image.

16. Product according to claim 15 wherein the vinyl monomer is N,N'-methylene-bis-acrylamide.

17. Method according to claim 1 wherein the coating composition also includes a small proportion of an ethylenically unsaturated monomer containing a

group.

18. Method according to claim 17 wherein the monomer is N,N'-methylene-bis-acrylamide.

No references cited.

NORMAN G. TORCHIN, *Primary Examiner.*

C. E. DAVIS, *Assistant Examiner.*